US011699184B2

(12) United States Patent
Overholser

(10) Patent No.: US 11,699,184 B2
(45) Date of Patent: Jul. 11, 2023

(54) CONTEXT BASED FILTERING WITHIN SUBSETS OF NETWORK NODES IMPLEMENTING A TRADING SYSTEM

(71) Applicant: tZERO IP, LLC, Salt Lake City, UT (US)

(72) Inventor: Scott Overholser, Salt Lake City, UT (US)

(73) Assignee: tZERO IP, LLC, Salt Lake City, UT (US)

( * ) Notice: Subject to any disclaimer, the term of this patent is extended or adjusted under 35 U.S.C. 154(b) by 858 days.

(21) Appl. No.: 16/596,290

(22) Filed: Oct. 8, 2019

(65) Prior Publication Data

US 2020/0126155 A1 Apr. 23, 2020

Related U.S. Application Data

(60) Provisional application No. 62/749,528, filed on Oct. 23, 2018.

(51) Int. Cl.
*G06Q 40/04* (2012.01)
*H04L 67/104* (2022.01)
*G06F 16/901* (2019.01)

(52) U.S. Cl.
CPC ......... *G06Q 40/04* (2013.01); *G06F 16/9024* (2019.01); *H04L 67/104* (2013.01)

(58) Field of Classification Search
None
See application file for complete search history.

(56) References Cited

U.S. PATENT DOCUMENTS

| 5,077,665 A | 12/1991 | Silverman et al. |
| 5,924,083 A | 7/1999 | Silverman et al. |
| 2015/0127515 A1 | 5/2015 | Studnitzer et al. |

(Continued)

FOREIGN PATENT DOCUMENTS

| EP | 0407026 B1 | 11/1995 |
| KR | 20180101547 A | 9/2018 |
| WO | 2018089815 A1 | 5/2018 |

OTHER PUBLICATIONS

Asayag et al. A Fair Consensus Protocol for Transaction Ordering. 2018 IEEE. (Year: 2018).*

(Continued)

*Primary Examiner* — Bryan Lee
(74) *Attorney, Agent, or Firm* — Fogg & Powers LLC

(57) ABSTRACT

A method includes generating first messages having a first message type, at a first subset of network nodes in a peer-to-peer network, based on requests received from a first external computing device; submitting second events to the peer-to-peer network, the first events having payloads that are based on the first message type; and using at least one directed acyclic graph (DAG) to attempt to reach a consensus about timestamps in the first events. The method also includes receiving, at a second subset of network nodes, events having different payload types from the peer-to-peer network and filtering for first events having payloads based on the first message type; and when one of the second subset of network nodes receives a first event having a payload that is based on the first message type, converting the payload into a second message that is sent to a second external computing device.

20 Claims, 7 Drawing Sheets

(56) References Cited

U.S. PATENT DOCUMENTS

2018/0075125 A1    3/2018  Stiel et al.
2019/0354518 A1*  11/2019  Zochowski ......... G06F 16/2379

OTHER PUBLICATIONS

Baird, "The Swirlds HashGraph Consensus Algorithm: Fair, Fast, Byzantine Fault Tolerance", Swirlds Tech Report Swirlds-TR-2016-01, May 31, 2016, pp. 1-28.
Sammantics, "A New Approach to Consensus: Swirlds HashGraph", Jul. 29, 2016, pp. 1-26.
International Searching Authority, "International Search Report and Written Opinion from PCT Application No. PCT/US2019/055229", from Foreign Counterpart to U.S. Appl. No. 16/596,290, dated Feb. 3, 2020, pp. 1-11, Published: WO.
Siim, "DAG-Based Distributed Ledgers", Research Seminar in Cryptology, Jun. 1, 2018, pp. 1-12, https://www.ethereum.org/.

* cited by examiner

CONTEXT BASED FILTERING WITHIN SUBSETS OF NETWORK NODES IMPLEMENTING A TRADING SYSTEM

CROSS-REFERENCE TO RELATED APPLICATIONS

This application claims the benefit of U.S. Provisional Patent Application Ser. No. 62/749,528 filed on Oct. 23, 2018, entitled "CONTEXT BASED FILTERING WITHIN SUBSETS OF NETWORK NODES IMPLEMENTING A TRADING SYSTEM", the entirety of which is incorporated herein by reference.

BACKGROUND

Markets and exchanges can be used to trade stocks, currencies, bonds, commodities, etc. between buyers and sellers.

SUMMARY

A system comprising multiple network nodes communicatively coupled in a peer-to-peer network is disclosed. The network nodes include a first subset of network nodes and a second subset of network nodes. The first subset of network nodes is configured to interface with at least a first external computing device. The second subset of network nodes is configured to interface with at least a second external computing device. The first subset of network nodes is configured to generate first messages having a first message type based on requests received from the first external computing device. The first subset of network nodes is configured to submit first events to the peer-to-peer network, the first events having payloads that are based on the first message type. The network nodes are configured to use at least one directed acyclic graph (DAG) to attempt to reach a consensus about timestamps in the first events. The second subset of network nodes is configured to receive events having different payload types from the peer-to-peer network and filter for first events having payloads based on the first message type. The second subset of network nodes is configured to, when a first event having a payload that is based on the first message type, convert the payload into a second message that is sent to a second external computing device.

A method is also disclosed. The method includes generating first messages having a first message type, at a first subset of network nodes in a peer-to-peer network, based on requests received from a first external computing device. The method also includes submitting second events to the peer-to-peer network, the first events having payloads that are based on the first message type. The method also includes using at least one directed acyclic graph (DAG) to attempt to reach a consensus about timestamps in the first events. The method also includes receiving, at a second subset of network nodes, events having different payload types from the peer-to-peer network and filtering for first events having payloads based on the first message type. The method also includes when one of the second subset of network nodes receives a first event having a payload that is based on the first message type, converting the payload into a second message that is sent to a second external computing device.

DRAWINGS

Understanding that the drawings depict only examples and are not therefore to be considered limiting in scope, the examples will be described with additional specificity and detail through the use of the accompanying drawings, in which.

Figure 1:
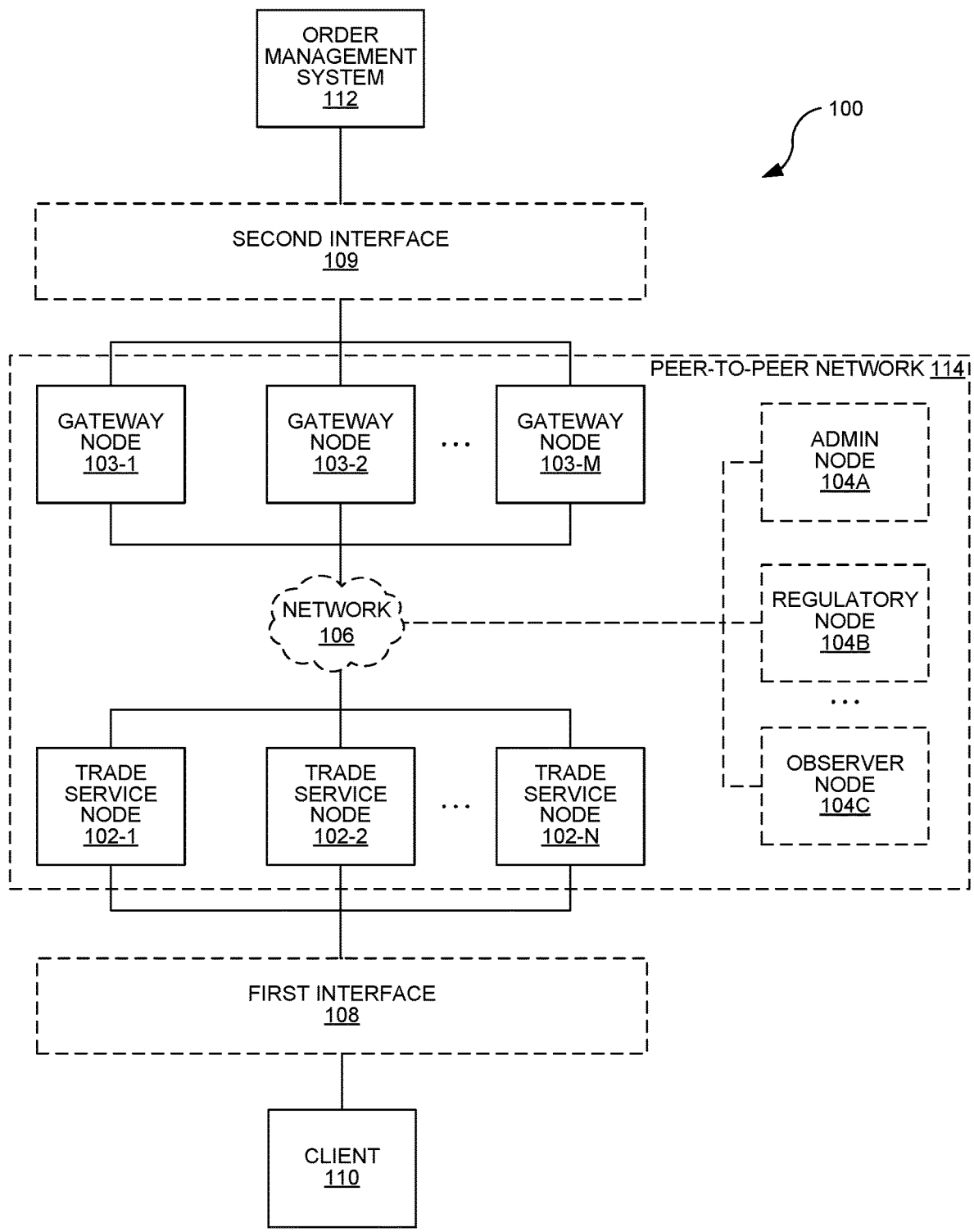
FIG. 1 is a block diagram illustrating an exemplary embodiment of a decentralized trading system with subsets of network nodes that perform context based filtering.

In accordance with common practice, the various described features are not drawn to scale but are drawn to emphasize specific features relevant to the examples.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the chronological order in which the individual steps may be performed. The following detailed description is, therefore, not to be taken in a limiting sense.

As used herein, the term "order" refers to a request to initiate a transaction or data that describes a request to initiate a transaction. An order may be a request to trade any type of asset including but not limited to, securities, security tokens, utility tokens, bonds, currencies (cryptocurrency or fiat), funds (such as exchange traded funds ("ETFs"), mutual funds, index funds, open-end funds, closed-end funds, high yield bond funds, corporate bond funds, municipal bond funds, government bond funds, bond funds, money market funds, balanced funds, equity funds, fixed income funds, global funds, international funds, specialty funds, index funds, commodity funds, currency funds, and/or real estate funds), and/or other assets. In examples, an order may be at least one of a buy, sell, and/or hold order. In examples, an order may include information for one or more parties to the trade, such as the type of order (buy, sell, hold, etc.), an indication of the asset being traded, and/or the quantity of the asset being traded. The order may also indicate optional attributes, such a limit price, stop price, conditional triggering requirements, duration (e.g., time in force) of the order, whether the order may be partially filled, etc.

A decentralized trading system may be implemented using a peer-to-peer network of nodes that acts as an intermediary between end users (who enter orders) and an order management system. The order management system in a trading system may match orders to each other (in preparation for execution of the orders) based at least in part on when the orders are made, e.g., when the orders are received at the trading system. Optionally, the matching also occurs based on other criteria in addition to the time the order is made, including the attributes in the order. In traditional centralized trading systems, a single entity receives all the trades and can easily and chronologically order them. In a decentralized trading system, a fair way of chronologically ordering trades that are received from various network nodes is desired to provide fairness during matching. This becomes particularly important when network nodes are distributed over large areas with larger differences in propagation delays and other delays of signals within the decentralized trading system. Accordingly, it may be desirable to implement trustless, consensus-based fair ordering in a trading system. Additionally, it may be desirable to maintain an auditable record of transactions in a trading system, e.g., for regulatory purposes.

A distributed ledger may be used to provide consensus-based fair ordering and/or maintain an auditable record of transactions in a decentralized trading system. As used herein, "consensus-based fair ordering" refers to an agreement, to some extent, within a network of nodes on a chronological order of events within the network of nodes. A distributed ledger is an electronic ledger that is distributed across multiple interconnected network nodes, where more than one of the network nodes may store a copy of the ledger. In examples, a distributed ledger may be implemented using a directed acyclic graph (DAG), e.g., IOTA or a hashgraph. A consensus may be reached in a DAG without proof-of-work and can instead use proof-of-stake.

Hashgraph is a platform/library in which network nodes in a peer-to-peer (P2P) network use a gossip protocol to exchange information with each other, i.e., the information (gossip) spreads by each network node repeatedly choosing another network node at random, and telling them all they know. This exchange of information automatically builds a hashgraph data structure (i.e., a data structure that records who gossiped to whom, and in what order) using a 'gossip about gossip' protocol where, in addition to sharing information about the transactions alone (gossip), the network nodes also share information about the history of the gossip itself (gossip about gossip).

Specifically, the sharing of transactions (also referred to as "messages" or "payloads") between nodes ("gossip") may be implemented as follows. When a node receives a transaction from another node, it may create a record of when that happened. Then, not only will the network node forward the transaction on to other nodes (e.g., as gossip mandates), it will also "gossip" out the record it created specifying when it received the transaction that it is now passing on. The network nodes don't gossip "naked" transactions, but rather bundle some number of transactions into a data structure called an "event". In addition to a transaction payload, a node may add two hashes to any event it creates: (1) the hash of the last event the network node received from another node; and (2) the hash of the last event the network node created. A node may also add a timestamp (of when the event is submitted to the peer-to-peer network) and digitally-sign the complete event structure before gossiping it out to another node.

This gossip process is highly organized, documented, and efficient. The two hashes allow all recipients of a new event to reconstruct what other nodes know of the transactions within. This enables the network nodes to quickly know what transactions have taken place and when they occurred. Such information can be used to reach consensus about the chronological order of events in the P2P network of nodes very quickly.

If every network node (within the P2P network of nodes) has identical copies of the hashgraph, a chronological order of transactions may be determined using any deterministic function based on the hashgraph. Where the copies of the hashgraph differ (e.g., because recent transaction(s) have not yet been received by every network node), consensus may be reached by the P2P network of nodes using virtual voting. Since every network node can calculate/simulate (based on the hashgraph) how other network nodes would vote (e.g., regarding ordering of transactions), the network nodes don't actually need to vote on the timestamp of transactions, i.e., the voting is virtual. Therefore, a network node may determine a chronological order of transactions based on the timestamps of transactions using a series of elections with virtual voting. In examples, virtual voting may include discarding one or more outlier votes and/or taking the median of the timestamps of events in the P2P network of nodes. Although the median of timestamps is preferred, an average or high/low midpoint of the timestamps may be used. As used herein, the term "consensus" may refer an agreement by at least $((2/3)+1)$ supermajority $((2/3)+1)$, a simple majority $((1/2)+1)$, or another predefined percentage of the active network nodes in the network of nodes, i.e., the term "consensus" does not require 100% of the network nodes in the network of nodes.

In examples, the hashgraph referred to herein operates as described in the May 31, 2016 Swirlds Tech Report by Leemon Baird entitled "THE SWIRLDS HASHGRAPH CONSENSUS ALGORITHM: FAIR, FAST, BYZANTINE FAULT TOLERANCE" (available at http://www.swirlds-.com/downloads/SWIRLDS-TR-2016-01.pdf), which is incorporated herein by reference.

A DAG (e.g., a hashgraph) may be used to provide fair ordering (e.g., ordering of received buy/sell/hold orders from a client (and optionally execution reports) from an order management system) in a decentralized trading system implemented using a peer-to-peer (P2P) network of nodes. In examples, the network nodes (implementing a DAG) may work together to reach a consensus on the chronological order that market trade requests (orders) were received at the various network nodes within the decentralized trading system (and/or the timestamps of the orders). In examples, the network nodes can then generate ordered data and verify the ordered data between one another. The ordered data can then be used by an order management system to match (and optionally execute) the orders with each other.

In examples, a first subset of the network nodes are trade service nodes that receive new orders from client(s) (e.g., web client(s)) and submit them to the peer-to-peer network. The peer-to-peer network may reach a consensus about the chronological order that the new orders were received in and/or the timestamp of receipt at the peer-to-peer network. The gateway nodes are a second subset of the network nodes that contextually filter for new orders output from the peer-to-peer network and pass them to the order management system. The gateway nodes may also receive order execution reports from the order management system and submit them to the peer-to-peer network. The trade service nodes may contextually filter for execution reports (and forward to the client). Preferably, the first subset of network nodes is mutually exclusive from the second subset of network nodes, however, other configurations (in which at least one trade service node is also a gateway node) are possible.

The term "front running" and its variants refers to entering a new order to benefit from nonpublic knowledge of a large pending transaction. In the absence of fair ordering, a decentralized trading system may be susceptible to front running when at least one of the network nodes is running faster (e.g., based on processing load, network congestion, hardware malfunction, etc.) and/or is geographically closer to the order management system than its peers. Since the decentralized trading system described herein provides fair ordering of new orders (e.g., in terms of the times that orders were received in the network of nodes), it has the advantage of preventing front running.

Another advantage of the decentralized trading system described herein is that, since the DAG reaches a consensus about the time and/or chronological order that new orders (and optionally execution reports) were received at the DAG, an auditable record of transactions is automatically created. This data may be used to reduce fraud in the system and help comply with various regulatory requirements, e.g., by the Securities and Exchange Commission (SEC) and/or Financial Industry Regulatory Authority (FINRA).

It should be noted that while the present systems and methods are described in terms of a trading system, the present systems and methods may be used in other contexts to provide trustless, consensus-based fair ordering and, optionally, to maintain an audit record of transactions in a decentralized system.

FIG. 1 is a block diagram illustrating an exemplary embodiment of a decentralized trading system 100 with subsets of network nodes 102-104 that perform context based filtering. Decentralized trading system 100 includes multiple network nodes 102 (such as N trade service nodes 102, M gateway nodes 103, and any quantity of optional observer nodes 104A-C), at least one client 110, and at least one order management system 112. The decentralized trading system 100 may include any number (N) of trade service nodes 102 and any number (M) of gateway nodes 103 (where M may or may not equal N).

In examples, the network nodes 102 are communicatively coupled to each other in a peer-to-peer network 114 that implements a distributed ledger. Preferably, the peer-to-peer network 114 implements a private ledger (e.g., a private peer-to-peer network 114 implementing the Hashgraph library), although other configurations are possible in which a public ledger (e.g., the public Hedera peer-to-peer network 114 that implements the Hashgraph platform/library) is used. The network nodes 102-104 may implement additional security protocols when participating in the peer-to-peer network 114, e.g., exchanging passwords, cryptographic keys, etc.

In examples, the network nodes 102-104, the computing device implementing the client 110, and/or the order management system 112 can be any of a mobile computing device, such as a mobile phone, tablet computer, mobile media device, mobile gaming device, laptop computer, vehicle-based computer, etc.; or a non-mobile device such as a dedicated terminal, a public terminal, a kiosk, a server, or a desktop computer. Each of the network nodes 102-104, the external computing device implementing the client 110, and/or the order management system 112 may be housed in a single physical housing or multiple physical housings.

In examples, each of the network nodes 102-104, the external computing device implementing the client 110, and/or the order management system 112 can have similar components. In examples, each of the network nodes 102-104, the external computing device implementing the client 110, and/or the order management system 112 includes at least one memory, at least one processor, at least one optional display device, at least one optional input device, at least one optional network interface, and at least one power source.

The network nodes 102-104 in the peer-to-peer network 114 may share information to build at least one hashgraph data structure stored on at least one network node 102-104 (in some configurations, a separate hashgraph data structure is generated and optionally stored at each network node 102-104). The hashgraph data structure(s) may act as a record of the chronological order that new orders are received in the peer-to-peer network 114 based on a consensus formed by the network nodes 102-104 in the peer-to-peer network 114. The network nodes 102-104 in the peer-to-peer network 114 may each implement a Hashgraph library that includes functions to reach consensus. Additionally, the network nodes 102-104 may also be configured to contextually filter events passed among the network nodes 102-104 in order to quickly identify payloads within the events that are relevant to the particular functions of each type of network node 102-104.

In examples, the network nodes 102-104 are communicatively coupled using a network 106. In examples, any combination of wired and wireless networks may be used to couple the network nodes 102-104 together. In examples, the network nodes 102-104 are communicatively coupled over at least one of at least one local area network (LAN), at least one wide area network (WAN), or the Internet. In examples, any combination of local area networks, wide area networks, and the Internet is used to couple the network nodes 102-104 together. It should be noted that the network nodes 102-104 in the peer-to-peer network 114 may be physically distributed across the world.

The client 110 (e.g., a web client) may be a set of instructions executed by one or more processors running on a computing device. The client 110 may communicate with end-user devices, e.g., mobile computing devices and/or or non-mobile devices. The client 110 may present a user interface to the user to enter an order. The user interface may include fields indicating the type of order (buy, sell, hold, etc.), asset identifier (e.g., Committee on Uniform Securities Identification Procedures (CUSIP) number, ticker symbol, etc.), the quantity of the asset being traded, a limit price, a stop price, conditional triggering requirements, duration (e.g., time in force) of the order, and/or whether the order may be partially filled. A user may interact with the user interface presented by the client to enter relevant information (e.g., order attributes) about a new order request.

In examples, the client 110 is implemented on a first external computing device that is communicatively coupled to at least one trade service node 102, e.g., via a network (not shown). Optionally, the client 110 communicates with the at least one trade service node 102 via a first interface 108. The first interface 108 may be a communication layer (e.g., network layer and/or physical layer) used to transport data, e.g., a medium, a VPN, a WAN, a link. The first interface 108 may include instructions that are executed (on a processor) in the trade service nodes 102 and/or as part of the client 110. In examples, the first interface 108 may utilize a library of functions (e.g., an application programming interface) relating to how the client 110 communicates with the trade service nodes 102, e.g., the library may be executed on the trade service nodes 102 and/or as part of the client 110. In examples, the first interface 108 may include instructions that initiate, use, and/or terminate a transport session, e.g., a Transport Layer Security (TLS), web socket, or Hyper Text Transfer Protocol Secure (HTTPS) session.

The client 110 may send the new order request (that is generated based on input from a user) to one of the trade service nodes 102, e.g., via the first interface 102. In examples (such as where market timing is important to the user), each new order request can be sent immediately from the client 110 to one of the trade service nodes 102 within the decentralized trading system 100. Alternatively, new order requests can be sent in batches from the client 110 to one of the trade service nodes 102.

The trade service nodes 102 may be a first subset of computing devices in the peer-to-peer network 114, e.g., that are owned and/or operated by or on behalf of broker-dealers, custodians, or any other type of financial services entity. The trade service nodes 102 may be configured to receive a new order request from the client 110, e.g., via the optional first interface 108. Upon receiving the new order request, the trade service nodes 102 may be configured to perform processing on the new order request. In examples, the processing includes generating a new order single message from the new order request from the client 110. In examples, the new order request may be received in any suitable format. In examples, the new order single message may be generated in a first format, e.g., a JavaScript Object Notation (JSON) modeled as a serialized version of a Financial Information eXchange (FIX) message.

The trade service nodes 102 may be configured to insert the new order single message as a payload in an event that is submitted to the peer-to-peer network 114 to form a consensus, e.g., about the timestamp of the new order single message (in the event) submitted to the peer-to-peer network 114. Therefore, in examples, the payload in the event may be a JSON representation of a FIX new order single message.

In examples, submitting the event to the peer-to-peer network 114 may include the trade service nodes 102 passing the new order single message to a submit function in a Hashgraph library (running on the network nodes 102-104 in the peer-to-peer network 114). Once called, the submit function may cause the trade service node 102 to send the event (with the new order single message as the payload) to another network node 102-104 in the peer-to-peer network 114. The event may include (1) the hash of the last event the trade service node 102 received from another node 102-104; and (2) the hash of the last event the trade service node 102 created. An event may also include a timestamp of submission to the peer-to-peer network 114 and/or a digital signature.

As each network node 102-104 in the peer-to-peer network 114 receives an event, the hashgraph data structure stored at the receiving network node 102-104 is updated based on the event. Following virtual voting, the Hashgraph library at a receiving node 102-104 may call a return transaction function (e.g., handleTransaction( )) with one or more of the following arguments: (1) the payload (or data derived from the payload) in the event; (2) a Boolean argument (e.g., isConsensus flag) indicating whether consensus was reached (by the peer-to-peer network 114) on the timestamp in the event; (3) the timestamp from the event; (4) an event ID; and/or (5) an address. The return transaction function (e.g., handleTransaction( )) may be implemented in an application that is separate from the Hashgraph library on each network node 102-104 in the peer-to-peer network 114. Depending on how it is implemented, the network node 102-104 on which the return transaction function (e.g., handleTransaction( ) is called may process the payload of the event differently. For example, the network node 102-104 may contextually filter for events having certain type(s) of payload(s) but not others, as described below.

The gateway nodes 103 may be a second subset of computing devices in the peer-to-peer network 114, e.g., that are owned and/or operated by or on behalf of broker-dealers, custodians, or any other type of financial services entity. Since they are part of the peer-to-peer network 114, the gateway nodes 103 may be configured to receive events submitted to the peer-to-peer network 114. The gateway nodes 103 may receive events including payloads of different types, but may only contextually filter for events having a subset of all the types of payloads. In examples, the types of payloads in events that are submitted to and output from a peer-to-peer network 114 include (but are not limited to) new order single messages, execution reports, order cancel requests, and/or order status requests.

Contextual filtering, as used herein, refers to identifying, selecting, determining, deriving, investigating, ascertaining, accessing, resolving, choosing, isolating, and/or otherwise processing (by one of the network nodes 102-104) payloads in events received from the peer-to-peer network 114. In examples, the gateway nodes 103 may contextually filter for new order single message payloads (in events submitted to the peer-to-peer network 114), but not for execution report payloads. Alternatively, the gateway node 103 may contextually filter for events having new order single message payloads, order cancel request payloads, and order status request payloads, but not other types of payloads (e.g., execution report payloads). Optionally, gateway nodes 103 may also contextually filter events based on whether a consensus has been reached for the timestamp in the event, e.g., whether isConsensus flag in a received event is true.

The contextual filtering based on payload type may be performed based on a type field included in received events (or payloads in the received events). In examples, the gateway nodes 103 may contextually filter for (e.g., identify) new order single message payloads for further processing in response to determining that a field in the event or payload identifies the payload as a new order single message. In other words, the gateway nodes 103 may examine/analyze/interpret the contents of an event payload during contextual filtering to determine the payload type.

If the payload of the event (or payload within the event) is the correct type for the network node 102-104 (and optionally consensus has been reached for the timestamp), the return transaction function in the network node 102-104 may further process the payload. In examples, when a gateway node 103 receives events having new order single message payload (and optionally a timestamp for which a consensus has been reached), the gateway node 103 may be configured to convert the new order single message payload into a second format (e.g., FIX) and send it to the order management system 112, e.g., in a FIX session.

It should be noted that a gateway node 103 may receive (from the peer-to-peer network 114) events having payloads that it does not contextually filter for (and optionally having a timestamp for which a consensus has not been reached). Upon receiving an event having a payload type that it is not contextually filtering for (or optionally a timestamp for which a consensus has not been reached), a return transaction function in the gateway node 103 may take no further action, although the Hashgraph library may pass the event to further nodes 102-104 (where indicated by the gossip protocol).

It should be noted that the gateway nodes 103 may additionally execute clustering software (e.g., the Akka library) that designates an actor singleton (a single active execution thread on a service running on one of the gateway nodes 103) that connects to the order management system 112. When the gateway node 103 (running the actor singleton) goes down, the clustering software may automatically designate a new gateway node 103 that a new actor singleton can run on. The FIX protocol may store metadata about execution state, including sequence number, so the FIX session can be restored on the new actor singleton. In examples, at least one (e.g., all) of the gateway nodes 103 may communicate with a database (not shown) that stores the FIX session metadata. In examples, the decentralized trading system 100 may include a cluster of three gateway nodes 103 for redundancy. Furthermore, even though only one actor singleton communicates with the order management system 112 at a time, the other gateway nodes 103 (not running the actor singleton thread) may still participate in reaching consensus with the other network nodes 102-104 in the peer-to-peer network 114.

In examples, the order management system 112 is communicatively coupled to at least one gateway node 103. Optionally, the order management system 112 may communicate with the at least one gateway node 103 via a second interface 109. The second interface 109 may be a communication layer (e.g., network layer and/or physical layer) used to transport data, e.g., medium, VPN, WAN, link. The second interface 109 may include instructions that are executed (on a processor) in the gateway nodes 103 and/or the order management system 112. In examples, the at least one gateway node 103 may receive an event having a new order single message payload in a first format (e.g., in the JSON format) and convert the payload into a second format (e.g., the FIX format). The FIX protocol is used for real-time exchange of information related to the securities transactions and markets. In examples, the second interface 109 may include instructions that initiate, use, and/or terminate a transport session, e.g., a FIX session.

The order management system 112 may maintain an order book. As used herein, the term "order book" refers to a collection of orders. The order book may be stored in a memory, e.g., one or more disk drives, flash drives, one or more databases, one or more tables, one or more files, local cache memories, processor cache memories, relational databases, flat databases, and/or the like. Orders in the order book may be matched together for trade execution.

In examples, any combination of wired and wireless networks (not shown) may be used to communicatively couple the order management system 112 to the at least one gateway node 103. In examples, the order management system 112 is communicatively coupled to at least one gateway node 103 over at least one of at least one local area network (LAN), at least one wide area network (WAN), or the Internet. Optionally, any quantity of intermediary devices may be positioned in the communication path between the order management system 112 and a gateway node 103 to which it is communicatively coupled, where the intermediary device(s) perform forwarding, relay, and/or routing of messages (e.g., FIX messages) between the order management system 112 and the gateway node 103. The order management system 112 can be communicatively coupled to multiple gateway nodes 103 in the peer-to-peer network 114.

The order management system 112 may be configured to receive a new order single message (e.g., according to the FIX protocol) from at least one gateway node 103. Upon receiving the new order single message, the order management system 112 may match the order (to another order) based on the type of order (buy, sell, hold, etc.), asset identifier (e.g., CUSIP number, ticker symbol, etc.), the quantity of the asset being traded, a limit price, stop price, conditional triggering requirements, duration (e.g., time in force) of the order, and/or whether the order may be partially filled. If the order is successfully matched, the order management system 112 may execute a trade requested by the new order single message. Alternatively, the order management system 112 may transmit the matched message to another device (not shown) for execution, e.g., an asset exchange device.

Once executed, the order management system 112 may generate an execution report. The execution report may include any of a timestamp of execution, expected settlement date, asset identifier (e.g., CUSIP number, ticker symbol, etc.), quantity, price, type of order, amount proceeds, commissions charged, and/or other fees charged for trade execution. Alternatively, if the execution of the trade is performed by another device (e.g., an asset exchange device), the execution report may be generated by and received from the executing device. The order management system 112 may transmit the execution report to one of the gateway nodes 103, e.g., the same or different gateway node 103 that transmitted the new order single message. In examples, the order management system 112 may transmit the execution report on the same FIX session that the new order single message was received on. Therefore, the execution report may travel across the second interface in the opposite direction as the new order single message. Optionally, the order management system 112 may generate a single execution report that includes information for multiple executed orders.

The gateway nodes 103 may be configured to receive execution reports (e.g., on a FIX session) and convert the execution reports from a second format (e.g., the FIX format) to a first format (e.g., JSON). Each gateway node 103 may also be configured to insert the converted execution report as a payload into an event that is submitted to the peer-to-peer network 114, e.g., by calling a submit function in the Hashgraph library, running on the network nodes 102-104 in the peer-to-peer network 114. The event may include (1) the hash of the last event the gateway node 103 received from another node 102-104; and (2) the hash of the last event the gateway node 103 created. The event may also include a timestamp of submission to the peer-to-peer network 114 and/or a digital signature.

In examples, the peer-to-peer network 114 may be acting primarily as a transport mechanism for events having execution report payloads (although a consensus may be reached for the timestamps in events having execution report payloads). Therefore, each gateway node 103 may be configured to (1) contextually filter for received events having new order single message payloads and/or timestamps for which a consensus has been reached; (2) convert new order single messages from a first format (e.g., a JSON representation of FIX) to a second format (e.g., FIX); (3) submit new order single messages (e.g., in the second format) to an order management system 112; (4) receive execution reports from the order management system 112 (e.g., in a FIX session); and (5) convert received execution reports from a second format (e.g., FIX) to a first format (e.g., a JSON representation of FIX); and (6) submit events having execution report payloads (e.g., in the first format) to the peer-to-peer network 114 (e.g., primarily as a transport mechanism).

Since they are part of the peer-to-peer network 114, the trade service nodes 102 may receive events that are submitted to the peer-to-peer network 114. Upon receiving an event at a trade service node 102, a return transaction function (e.g., handleTransaction( )) in the trade service node 102 may be called with one or more of the following arguments: (1) the payload (or data derived from the payload) in the event; (2) a Boolean argument (e.g., isConsensus) indicating whether consensus was reached (by the peer-to-peer network 114) on the timestamp in the event; (3) the timestamp from the event; (4) an event ID; and/or (5) an address. The return transaction function (e.g., handleTransaction( )) may be implemented in an application that is separate from the Hashgraph library on each trade node 102-104 in the peer-to-peer network 114.

In examples, the trade service nodes 102 may contextually filter for execution report payloads (in events submitted to the peer-to-peer network 114), but not for new order single message payloads, order cancel request payloads, or order status request payloads. Optionally, trade service nodes 102 may also contextually filter events based on whether a consensus has been reached for the timestamp in the event, e.g., whether an isConsensus flag in a received event is true.

The trade service nodes 102 may contextually filter for events having execution report payloads based on determining that a field in the event or payload identifies the payload as an execution report payload. In other words, the trade service nodes 102 may examine/analyze/interpret the contents of an event payload during contextual filtering to determine the payload type.

When one of the trade service nodes 102 identifies an event having an execution report payload (and optionally consensus has been reached for the timestamp), the trade service node 102 may be configured to generate a notification based on the execution report payload, and send the notification to the client 110, e.g., in a TLS, web socket, or HTTPS session. The execution report payload in the event may be a first format (e.g., JSON representation of a FIX message), while the notification is in a different format.

It should be noted that the trade service nodes 102 may receive (from the peer-to-peer network 114) events having payloads that it does not contextually filter for (and optionally having a timestamp for which a consensus has not been reached). Upon receiving an event having a payload type that it is not contextually filtering for (or optionally a timestamp for which a consensus has not been reached), a return transaction function in a trade service node 102 may take no further action, although the Hashgraph library may pass the event to further nodes 102-104 (where indicated by the gossip protocol).

Therefore, each trade service node 102 may be configured to (1) receive new order requests from the client 110; (2) generate new order requests in the first format (e.g., a JSON representation of a FIX message) based on the new order requests; (3) submit events having a new order single message payloads (generated based on the new order requests) to the peer-to-peer network 114; (4) contextually filter for received events having execution report payloads (and optionally timestamps for which a consensus has been reached); (5) generate notifications based on the events having execution report payloads; and/or (6) send notifications to one or more clients 110.

Optionally, a trade service node 102 may track the status of each new order single message that it creates (from a respective new order request from the client 110). Therefore, each trade service node 102 may optionally associate execution report payloads in received events having new order single message payloads with events that it previously generated and submitted to the peer-to-peer network 114.

It should also be noted that the same or different trade service node 102 that transmitted the event having the new order single message payload (associated with the event having the execution report payload) may receive and process the event having the execution report payload. The client 110 may receive the notification and present it to the user (e.g., in a user interface) and/or transmit a notification to the user, e.g., via phone, text, e-mail, etc.

Optionally, various users may have access to one or more of the trade service nodes 102 and the data they generate as part of the decentralized trading system 100, e.g., via a user interface, client 110, and/or API. Different users may have different privileges at the trade service node(s) 102. In examples, an individual investor may have restricted privileges that permits them to place, modify, receive status of, and/or cancel order requests on their own behalf. However, institutional investors, broker-dealers, and/or custodians may have broader privileges that permits them to place, modify, receive status of, and/or cancel order requests placed on their own behalf or their clients' behalf. Moreover, an administrator may optionally have administrator privileges that permits it to place, modify, receive status of, and/or cancel any order requests.

In addition to the trade service nodes 102 and gateway nodes 103, the peer-to-peer network 114 may include one or more observer nodes 104. Observer nodes 104 may perform administrative (e.g., admin node 104A), regulatory (e.g., a regulatory node 104B), archival, and/or digital signature functions.

The optional at least one admin node 104A may be a type of observer node 104 in the peer-to-peer network 114. The admin node 104A may be owned and/or operated by or on behalf of an administrator of the decentralized trading system 100 or a third-party data service provider. In contrast to the trade service nodes 102 and the gateway nodes 103 that contextually filter for events having only a subset of payload types in the peer-to-peer network 114, the admin node 104A may contextually filter for events having all types of payloads submitted to the peer-to-peer network 114. Alternatively, the admin node 104A may contextually filter for events having only a subset of types of payloads submitted to the peer-to-peer network 114. Furthermore, the admin node 104A may be an observer of the events submitted to the peer-to-peer network 114, but preferably does not submit any events to the peer-to-peer network 114 (although the admin node 104A may communicate with other computing devices and/or systems outside of the peer-to-peer network 114).

The admin node 104A may provide one or more services relating to transactions in the decentralized trading system 100. The services may be a set of instructions that execute on at least one processor in the admin node 104A. In examples, the admin node 104A may execute an account service that calculates and/or updates balances in a customer account. The account service may contextually filter for events having new order single message payloads and/or execution report payloads submitted to the peer-to-peer network 114.

In examples, and without limitation, a customer account may utilize a wallet. The term "wallet" refers to a software program, digital file, and/or memory used to store and/or manage digital assets, such as security tokens 102. In examples, a wallet may be defined by one or more private keys, one or more public keys derived from one or more private keys, and/or one or more transaction addresses derived from one or more private keys and/or one or more public keys. In examples, a wallet may be defined by one or more private account keys (and optional corresponding public account key(s)), each of which may have one or more child and/or grandchild transaction keys.

In examples, the admin node 104A may execute a transfer agent service that records changes in ownership of securities. In examples, the transfer agent service may record changes in (1) beneficial ownership for custodial assets, and/or (2) registered ownership for assets held directly by a customer. In examples, the transfer agent service may report executed trades (e.g., based on execution reports) to a third-party system (outside the peer-to-peer network 114), e.g., by periodically sending batches of multiple execution reports to the third-party system. The transfer agent service may contextually filter for events having new order single message payloads and/or execution report payloads submitted to the peer-to-peer network 114, e.g., but not order status requests and/or order cancel requests.

The optional at least one regulatory node 104B may be a type of observer node 104 in the peer-to-peer network 114. The regulatory node 104B may be owned and/or operated by or on behalf of one or more regulatory agencies, e.g., the SEC and/or FINRA. Like the admin node 104A, the regulatory node 104B may contextually filter for event having all types of payloads submitted to the peer-to-peer network 114. Alternatively, the regulatory node 104B may contextually filter for events having only a subset of types of payloads submitted to the peer-to-peer network 114. Furthermore, the regulatory node 104B may be an observer of the events submitted to the peer-to-peer network 114, but preferably does not submit any events to the peer-to-peer network 114 (although the regulatory node 104B may communicate with other computing devices and/or systems outside of the peer-to-peer network 114).

The regulatory node 104B may execute a regulatory service that monitors the transactions in the decentralized trading system 100 for compliance with relevant securities laws and regulations. The regulatory service may contextually filter for events having new order message payloads and/or execution report payloads output from the peer-to-peer network 114. In examples, the regulatory service may build a hashgraph (since the regulatory node 104B is one of the network nodes 102-104 implementing the peer-to-peer network 114). The regulatory node 104B may also receive at least one digitally-signed hash (from at least one other network node 102-104 in the peer-to-peer network 114) of the transactions in the peer-to-peer network 114. In examples, the regulatory service may compare the chronological order of transactions determined from its hashgraph with the digitally-signed hash(es) from the at least one other network node 102-104 to determine whether the orders were placed in an order book of the order management system 112 and/or executed in the same chronological order that was determined by the peer-to-peer network 114.

Therefore, the decentralized trading system 100 may utilize a peer-to-peer network 114 that provides several advantages over centralized trading systems (and other decentralized trading systems). For example, the decentralized trading system 100 may provide fair ordering by arriving at a consensus for the chronological order of transactions occurring in the peer-to-peer network 114, e.g., the chronological order that events having new order single message payloads were received by the peer-to-peer network 114. Each of the network nodes 102-104 may include information (e.g., event timestamps for which a consensus has been reached) that can be used to order the transactions in the peer-to-peer network 114, e.g., the chronological order in which events were submitted to the peer-to-peer network 114. By providing fair ordering of new orders (e.g., in terms of the timestamps that orders were received in the peer-to-peer network 114), it has the advantage of preventing front running.

Furthermore, the hashgraph(s) built by the network nodes 102-104 in the peer-to-peer network 114 may preserve a record of the transactions in the peer-to-peer network 114. Alternatively, one or more network nodes 102-104 (e.g., an admin node 104A) in the peer-to-peer network 114 may periodically digitally-sign a hash of the transactions for storage, e.g., in a traditional database or in a blockchain, such as the Bitcoin blockchain. The hashgraph and/or the digitally-signed hash may be used by a regulatory authority (for regulatory compliance) or another third-party as an audit trail, e.g., in real-time, near real-time, or non-real-time.

Figure 2A:
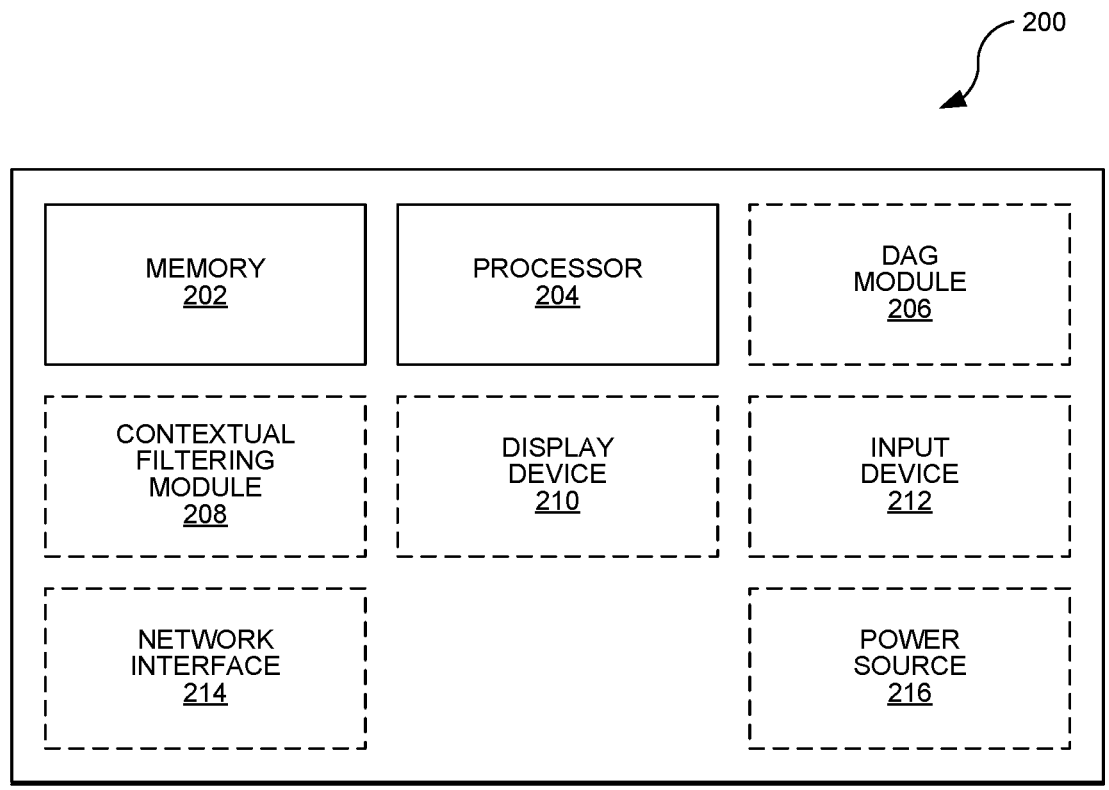
FIG. 2A is a block diagram illustrating an exemplary embodiment of a network node used within a decentralized trading system with subsets of network nodes that perform context based filtering.

FIG. 2A is a block diagram illustrating an exemplary embodiment of a network node 200 used within a decentralized trading system 100 with subsets of network nodes 102-104 that perform context based filtering. Network node 200 includes at least one memory 202, at least one processor 204, optional at least one DAG module 206, an optional contextual filtering module 208, an optional at least one display device 210, an optional at least one input device 212, an optional network interface 214, and an optional power source 216. In examples, the network node 200 may be used to implement a trade service node 102, a gateway node 103, an admin node 104A, and/or a regulatory node 104B in a peer-to-peer network 114.

In examples, the at least one memory 202 can be any device, mechanism, or populated data structure used for storing information. In examples, the at least one memory 202 can be or include any type of volatile memory, non-volatile memory, and/or dynamic memory. For example, the at least one memory 202 can be random access memory, memory storage devices, optical memory devices, magnetic media, floppy disks, magnetic tapes, hard drives, erasable programmable read-only memories (EPROMs), electrically erasable programmable read-only memories (EEPROMs), optical media (such as compact discs, DVDs, Blu-ray Discs) and/or the like. In accordance with some embodiments, the at least one memory 202 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information which can be used as the at least one memory 202. The at least one memory 202 may be used to store instructions for running one or more applications or modules on the at least one processor 204. For example, the at least one memory 202 could be used in one or more embodiments to house all or some of the instructions needed to execute the functionality of the optional at least one DAG module 206 and/or the optional at least one contextual filtering module 208.

In examples, the at least one processor 204 can be any known processor, such as a general purpose processor (GPP) or special purpose (such as a field-programmable gate array (FPGA), application-specific integrated circuit (ASIC) or other integrated circuit or circuitry), or any programmable logic device. In examples, the optional at least one DAG module 206 and/or the optional at least one contextual filtering module 208 are implemented by the at least one processor 204 and the at least one memory 202.

In examples, the optional at least one display device 210 includes at least one of a light emitting diode (LED), a liquid crystal display (LCD), a light emitting diode (LED) display, an organic light emitting diode (OLED) display, an e-ink display, a field emission display (FED), a surface-conduction electron-emitter display (SED), or a plasma display. In examples, the optional at least one input device 212 include at least one of a touchscreen (including capacitive and resistive touchscreens), a touchpad, a capacitive button, a mechanical button, a switch, a dial, a keyboard, a mouse, a camera, a biometric sensor/scanner, etc. In examples, the optional at least one display device 210 and the optional at least one input device 212 are combined into a human machine interface (HMI) for user interaction with the computing device 104A.

In examples, the at least one optional network interface 214 includes or is coupled to at least one optional antenna for communication with a network. In examples, the at least one optional network interface 214 includes at least one of an Ethernet interface, a cellular radio access technology (RAT) radio, a Wi-Fi radio, a Bluetooth radio, or a near field communication (NFC) radio. In examples, the at least one optional network interface 214 includes a cellular radio access technology radio configured to establish a cellular data connection (mobile internet) of sufficient speeds with a remote server using a local area network (LAN) or a wide area network (WAN). In examples, the cellular radio access technology includes at least one of Personal Communication Services (PCS), Specialized Mobile Radio (SMR) services, Enhanced Special Mobile Radio (ESMR) services, Advanced Wireless Services (AWS), Code Division Multiple Access (CDMA), Global System for Mobile Communications (GSM) services, Wideband Code Division Multiple Access (W-CDMA), Universal Mobile Telecommunications System (UMTS), Worldwide Interoperability for Microwave Access (WiMAX), 3rd Generation Partnership Projects (3GPP) Long Term Evolution (LTE), High Speed Packet Access (HSPA), third generation (3G) fourth generation (4G), fifth generation (5G), etc. or other appropriate communication services or a combination thereof. In examples, the at least one optional network interface 214 includes a Wi-Fi (IEEE 802.11) radio configured to communicate with a wireless local area network that communicates with the remote server, rather than a wide area network. In examples, the at least one optional network interface 214 includes a near field radio communication device that is limited to close proximity communication, such as a passive near field communication (NFC) tag, an active near field communication (NFC) tag, a passive radio frequency identification (RFID) tag, an active radio frequency identification (RFID) tag, a proximity card, or other personal area network device. In examples, the same at least one optional network interface 214 is also used for communication with an external gateway device to a network (such as an NFC payment terminal).

In examples, at least one optional power source 216 is used to provide power to the various components of the network node 200.

Each network node 200 (in a peer-to-peer network 114) may participate in the chronological ordering of new orders received from at least one client 110. The ordering may be based on a DAG (e.g., a hashgraph data structure) that is built by each network node 200. An optional DAG module 206 may be used to (1) submit new orders to the peer-to-peer network 114 (e.g., using a submit function in a Hashgraph library running on the network node 200); (2) build a DAG data structure (e.g., hashgraph) based on events received from a peer-to-peer network 114 (e.g., including new orders received at other network nodes in the peer-to-peer network 114); and/or (3) determine a chronological order of events occurring in the peer-to-peer network 114, e.g., the chronological order that new orders were received in the peer-to-peer network 114 based on the DAG data structure (e.g., hashgraph). The optional DAG module 206 may utilize the network interface 214 to send data to and receive data from other network nodes 102-104 within the peer-to-peer network 114.

Each network node 200 in a peer-to-peer network 114 may also include a contextual filtering module 208. Depending on the type of network node 200 it is located in, the contextual filtering module 208 in each network node 200 may contextually filter for events having one or more types of payloads, e.g., each network node 200 may receive events having all types of payloads submitted to the peer-to-peer network 114, but may selectively process events having only a subset of types of payloads. In examples, the contextual filtering module 208 in a trade service node 102 may contextually filter for events having execution report payloads output from the peer-to-peer network 114, but not other types of payloads. In examples, the contextual filtering module 208 in a gateway node 103 may contextually filter for events having new order single message payloads, but not other types of payloads. Alternatively, or additionally, the contextual filtering module 208 in a gateway node 103 may contextually filter for events having order cancel request payloads and/or order status request payloads (but still less than all types of payloads). In examples, the contextual filtering module 208 in an observer node 104 may contextually filter for events having new order single message payloads and execution report payloads (and optionally order cancel request payloads and/or order status request payloads).

Figure 2B:
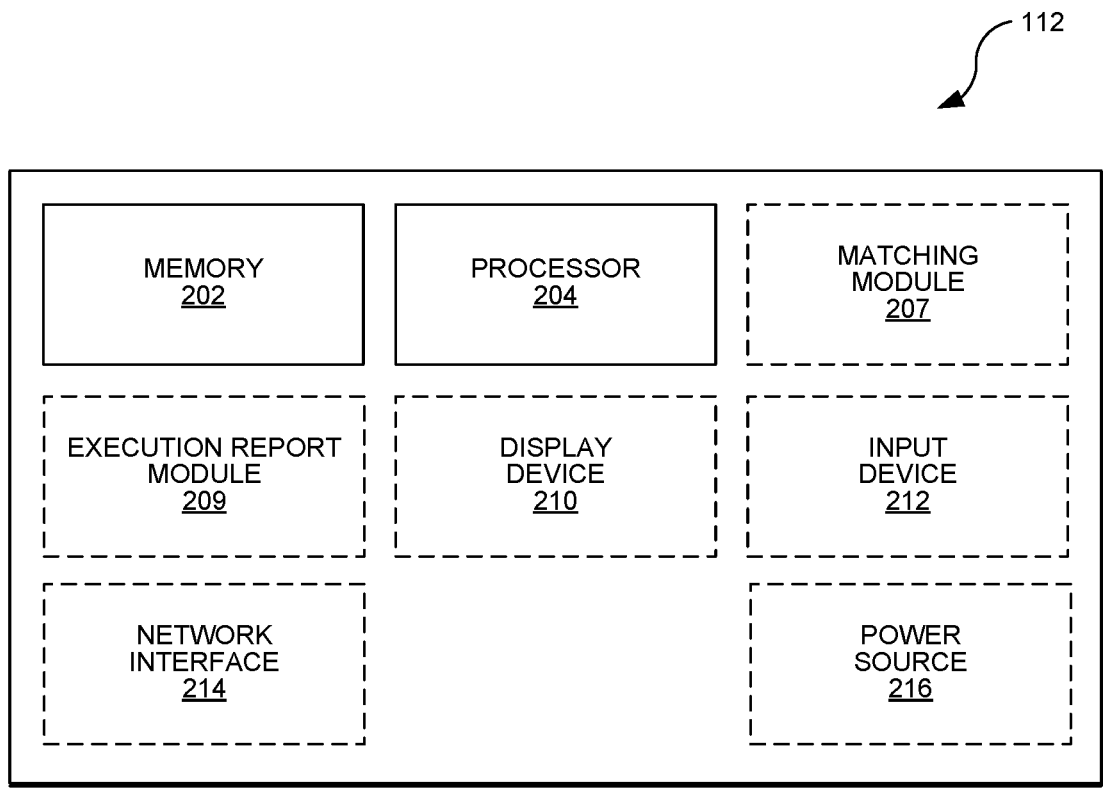
FIG. 2B is a block diagram illustrating an exemplary embodiment of an order management system that matches orders received by a peer-to-peer network.

FIG. 2B is a block diagram illustrating an exemplary embodiment of an order management system 112 that matches orders received by a peer-to-peer network 114. The order management system 112 includes at least one memory 202, at least one processor 204, an optional at least one display device 210, an optional at least one input device 212, an optional network interface 214, and an optional power source 216, which operate according to similar principles and methods as those described in conjunction with the network node 200 in FIG. 2A.

Unlike the network node 200, the order management system 112 may include a matching module 207. Upon receiving a new order single message, the matching module 207 may match the new order (to another order) based on the type of order (buy, sell, hold, etc.), asset identifier (e.g., CUSIP number, ticker symbol, etc.), the quantity of the asset being traded, a limit price, stop price, conditional triggering requirements, duration (e.g., time in force) of the order, and/or whether the order may be partially filled. The order management system 112 may be configured to match the ordered market trade requests (ordered in a single order consistent for each of the network nodes 102-104) with each other. The new order single messages are transmitted to the order management system 112 by a gateway node 103. In examples, the transmitting gateway node 103 may also indicate the chronological order that the new order single message was received by the peer-to-peer network 114.

If the order (e.g., in an order book) is successfully matched by the matching module 207, the order management system 112 may execute a trade requested by the new order single message (e.g., in the FIX format). Alternatively, the order management system 112 may transmit the matched message to another device (not shown) for execution, e.g., an asset exchange device.

Unlike the network node 200, the order management system 112 may also include an execution report module 209 that generates (or receives from another device) an execution report for the executed trade. The execution report may include any of a timestamp of execution, expected settlement date, asset identifier (e.g., CUSIP number, ticker symbol, etc.), quantity, price, type of order, amount proceeds, commissions charged, and/or other fees charged. Alternatively, if the execution of the trade is performed by another device (e.g., an asset exchange device), the execution report may be generated by and received from the executing device. The order management system 112 may transmit the execution report to one of the gateway nodes 103, e.g., the same or different gateway node 103 that transmitted the new order single message associated with the execution report.

Figure 2C:
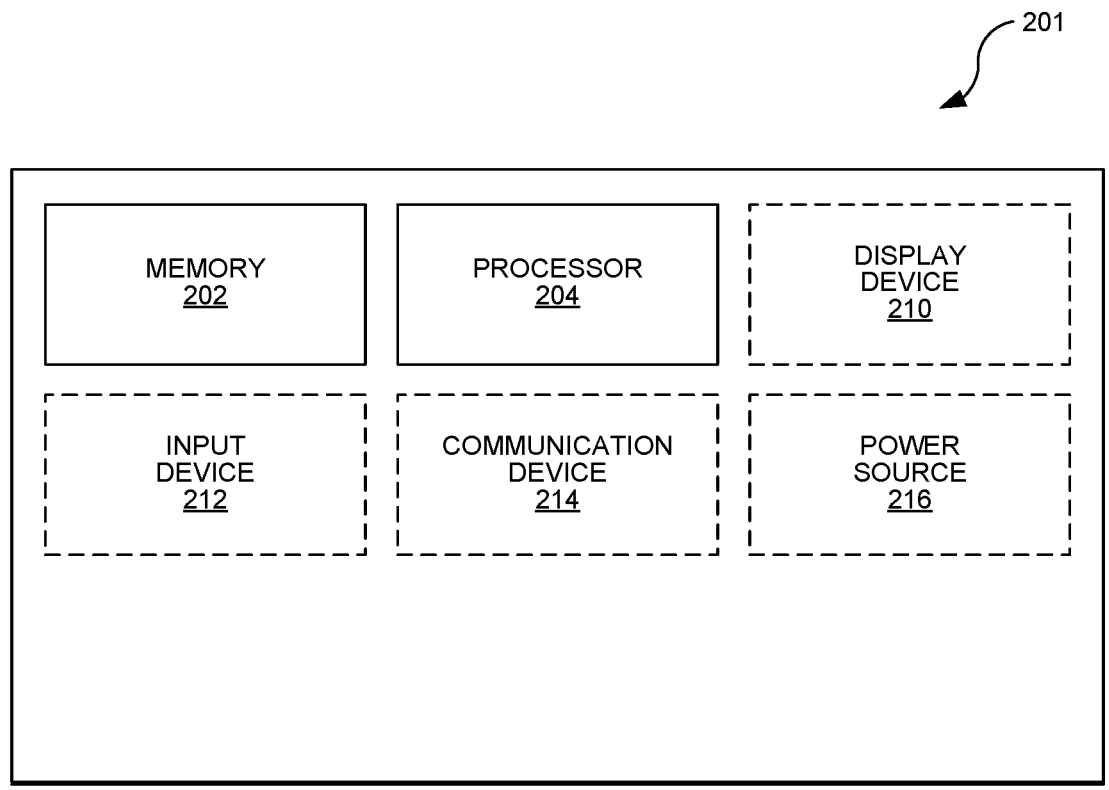
FIG. 2C is a block diagram illustrating an exemplary embodiment of a computing device implementing a client that receives orders from end-user devices and sends them to a peer-to-peer network.

FIG. 2C is a block diagram illustrating an exemplary embodiment of a computing device 201 implementing a client 110 that receives orders from end-user devices and sends them to a peer-to-peer network 114. The computing device 201 (e.g., mobile or non-mobile computing device) includes at least one memory 202, at least one processor 204, an optional at least one display device 210, an optional at least one input device 212, an optional network interface 214, and an optional power source 216, which operate according to similar principles and methods as those described in conjunction with the network node 200 and order management system 112 in FIG. 2A and FIG. 2B, respectively.

The computing device 201 may implement a web client that presents a user interface to a user. The user interface may include fields relating to new order requests, e.g., the type of order (buy, sell, hold, etc.), asset identifier (e.g., Committee on Uniform Securities Identification Procedures (CUSIP) number, ticker symbol, etc.), the quantity of the asset being traded, a limit price, a stop price, conditional triggering requirements, duration (e.g., time in force) of the order, and/or whether the order may be partially filled. A user may interact with the user interface presented by the client to enter relevant information (e.g., order attributes) about a new order request, e.g., via the input device 212. Upon receiving the user input, the computing device 201 may generate and transmit the new order request to a trade service node 102 in a peer-to-peer network 114.

Figure 3A:
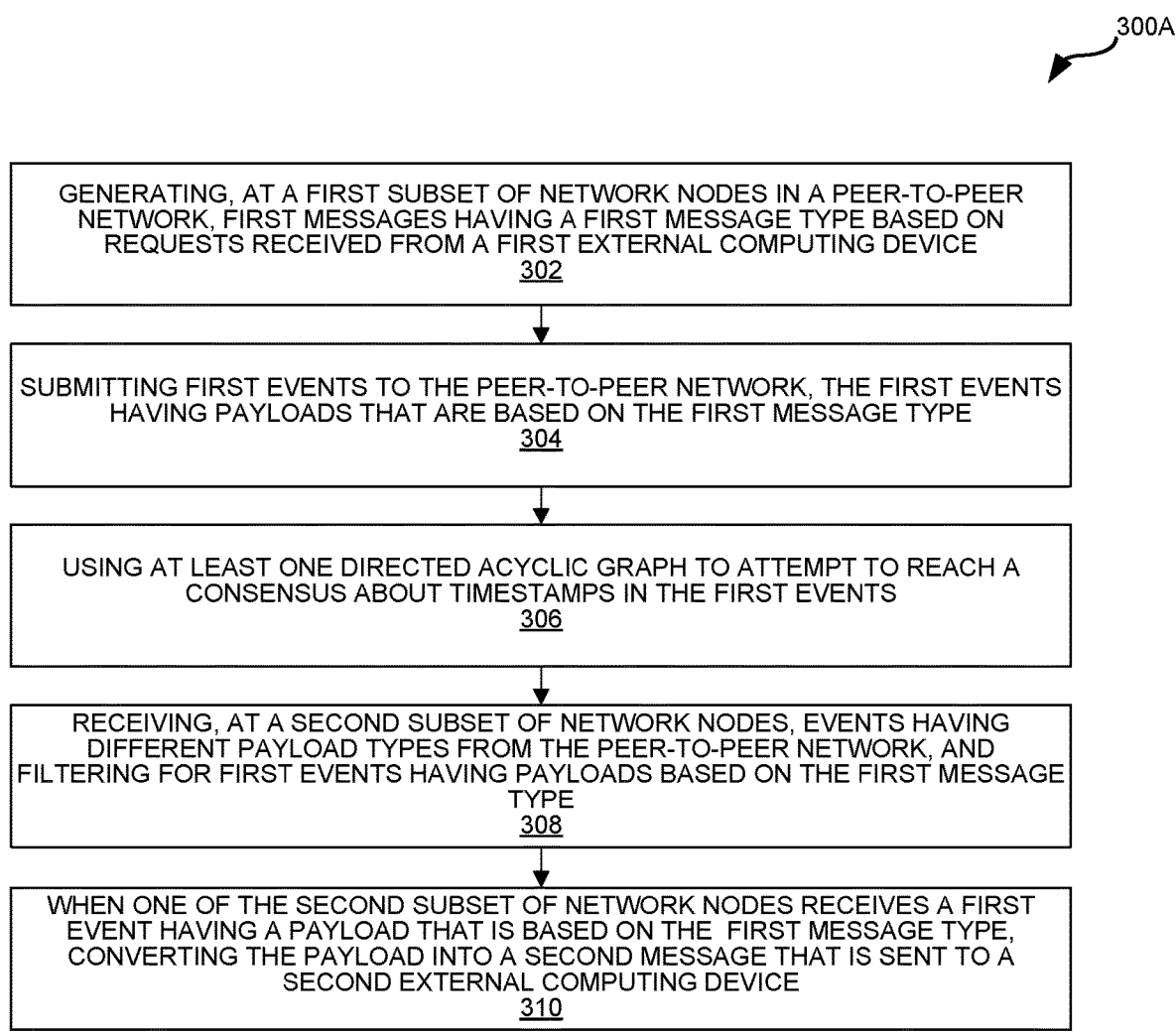
FIG. 3A is a flow diagram illustrating an exemplary method for context based filtering within subsets of network nodes implementing a trading system.

FIG. 3A is a flow diagram illustrating an exemplary method 300A for context based filtering within subsets of network nodes 102-104 implementing a trading system 100. In examples, at least two different subsets of network nodes (and optionally more than two) are used to implement a peer-to-peer network 114. Each of the multiple nodes 102-104 may build a hashgraph to build a consensus about the ordering of events within the peer-to-peer network 114, e.g., a consensus about the timestamp indicating when events were submitted to the peer-to-peer network 114. Each network node 102-104 may include at least one processor executing instructions stored on at least one memory.

Preferably, the first subset of network nodes 102-104 (e.g., trade service nodes 102) is mutually exclusive from the second subset of network nodes 102-104 (e.g., gateway nodes 103), however, other configurations (in which at least one network node 102-104 in the first subset is also in the second subset) are possible. In addition to the peer-to-peer network 114, the trading system 100 may include at least a first external computing device 110 (e.g., a computing device 201 implementing a client 110) and a second external computing device 112 (e.g., an order management system 112).

Exemplary method 300A begins at block 302 where at (at least one of) the first subset of network nodes 102-104 generates first messages having a first message type based on requests received from the first external computing device 110. In examples, the requests are new order requests, order cancel requests, and/or order status requests. New order requests (and/or subsequent events and/or payloads generated based on the new order requests) may include fields indicating the type of order (buy, sell, hold, etc.), asset identifier (e.g., CUSIP number, ticker symbol, etc.), the quantity of the asset being traded, a limit price, a stop price, conditional triggering requirements, duration (e.g., time in force) of the order, and/or whether the order may be partially filled.

Optionally, the first external computing device 110 communicates with the first subset of network nodes 102 via a first interface 108. The first interface 108 may be a communication layer (e.g., network layer and/or physical layer) used to transport data, e.g., a medium, a VPN, a WAN, a link. The first interface 108 may include instructions that are executed (on a processor) in the first subset of network nodes 102 and/or as part of the first external computing device 110. In examples, the first interface 108 may utilize a library of functions (e.g., an application programming interface) relating to how the first external computing device 110 communicates with the first subset of network nodes 102. In examples, the first interface 108 may include instructions that initiate, use, and/or terminate a transport session, e.g., a Transport Layer Security (TLS), web socket, or Hyper Text Transfer Protocol Secure (HTTPS) session.

Exemplary method 300A proceeds to block 304 where first events are submitted to the peer-to-peer network 114, the first events having payloads that are based on the first message type. Therefore, submitting a first event to the network nodes 102-104 may include one of the first subset of network nodes 102: (1) generating a first event having a payload that is based on the first message type; and (2) sending the first event to another network node 102-104 in the peer-to-peer network 114, which sends the first event to another network node 102-104, etc.

The first event may be generated by passing a first message (e.g., new order single message) to a submit function in a Hashgraph library (running on one of the first subset of network nodes 102). In addition to the payload (based on a first message type), each first event may include (1) the hash of the last event the one of the first subset of network nodes 102 received from another node 102-104; (2) the hash of the last event the one of the first subset of network nodes 102 created; and/or (3) a timestamp of submission to the peer-to-peer network 114 and/or a digital signature.

Exemplary method 300A proceeds to block 306 where at least one directed acyclic graph (DAG) is used to attempt to reach a consensus about timestamps in the first events. In examples, the DAG is a hashgraph. As first events are communicated among the network nodes 102-104 in the peer-to-peer network 114, the hashgraph data structures stored at each network node 102-104 are updated with the message. Consensus may be reached using virtual voting on the basis of events passed within the peer-to-peer network 114, as described above.

Exemplary method 300A proceeds to block 308 where (at least one of) the second subset of network nodes 103 within the network nodes 102-104 receives events having multiple payload types from the peer-to-peer network 114, and filters for first events having payloads based on at least the first message type (e.g., but not at least some other types of payloads). In examples, the events that are submitted to and output from the peer-to-peer network 114 have payload types that include (but are not limited to) new order single messages, execution reports, order cancel requests, and/or order status requests.

The filtering may be performed (upon receiving an event, e.g., a first event) by calling a return transaction function (e.g., handleTransaction( )) (in the Hashgraph library at a receiving node 102-104) with one or more of the following arguments: (1) the payload (or data derived from the payload) in the first event; (2) a Boolean argument (e.g., isConsensus) indicating whether consensus was reached (by the peer-to-peer network 114) on the timestamp in the first event; (3) the timestamp from the first event; (4) an event ID for the first event; and/or (5) an address. The return transaction function (e.g., handleTransaction( )) may be implemented in an application that is separate from the Hashgraph library on each trade node 102-104 in the peer-to-peer network 114.

In examples, the second subset of network nodes (e.g., gateway nodes 103) may filter for first events having payloads that are based on the first message type, but not events having at least one other type of payload, e.g., the second subset of network nodes 103 may filter for events having new order single message payloads (and optionally order cancel request payloads, and/or order status request payloads), but not for order execution report payloads. Therefore, the second subset of network nodes 103 may examine/analyze/interpret the contents of an event payload (e.g., in a first event) during the filtering to determine the payload type. Optionally, the second subset of network nodes (e.g., gateway nodes 103) may also contextually filter events based on whether a consensus has been reached for the timestamp in the event, e.g., whether isConsensus flag in a received event is true.

Exemplary method 300A proceeds to block 310 where, when one of the second subset of network nodes 103 receives a first event having a payload that is based on the first message type (and optionally a timestamp for which a consensus has been reached), the network node 103 may convert the payload into a second message (based on the payload of the first event) that is sent to a second external computing device 112, e.g., in a FIX session. The network node 103 may convert the payload of the first event from a first format (e.g., a JSON new order single message) into a second format (e.g., a FIX new order single message).

Optionally, the second subset of network nodes 103 may communicate with the second external computing device 112 via a second interface 109. The second interface 109 may be a communication layer (e.g., network layer and/or physical layer) used to transport data, e.g., a medium, a VPN, a WAN, a link. The second interface 109 may include instructions that are executed (on a processor) in the second subset of network nodes 103 and/or as part of the second external computing device 112. In examples, the second interface 109 may utilize a library of functions (e.g., an application programming interface) relating to how the second subset of network nodes 103 communicate with the second external computing device 112. In examples, the second interface 109 may include instructions that initiate, use, and/or terminate an exchange protocol session, e.g., a FIX session.

It should be noted that the second subset of network nodes 103 may receive (from the peer-to-peer network 114) events having payloads that it does not contextually filter for (and optionally having a timestamp for which a consensus has not been reached). Upon receiving an event having a payload type that it is not contextually filtering for (or optionally a timestamp for which a consensus has not been reached), a return transaction function in each node 103 may take no further action, although the Hashgraph library may pass the event to further nodes 102-104 (where indicated by the gossip protocol).

Figure 3B:
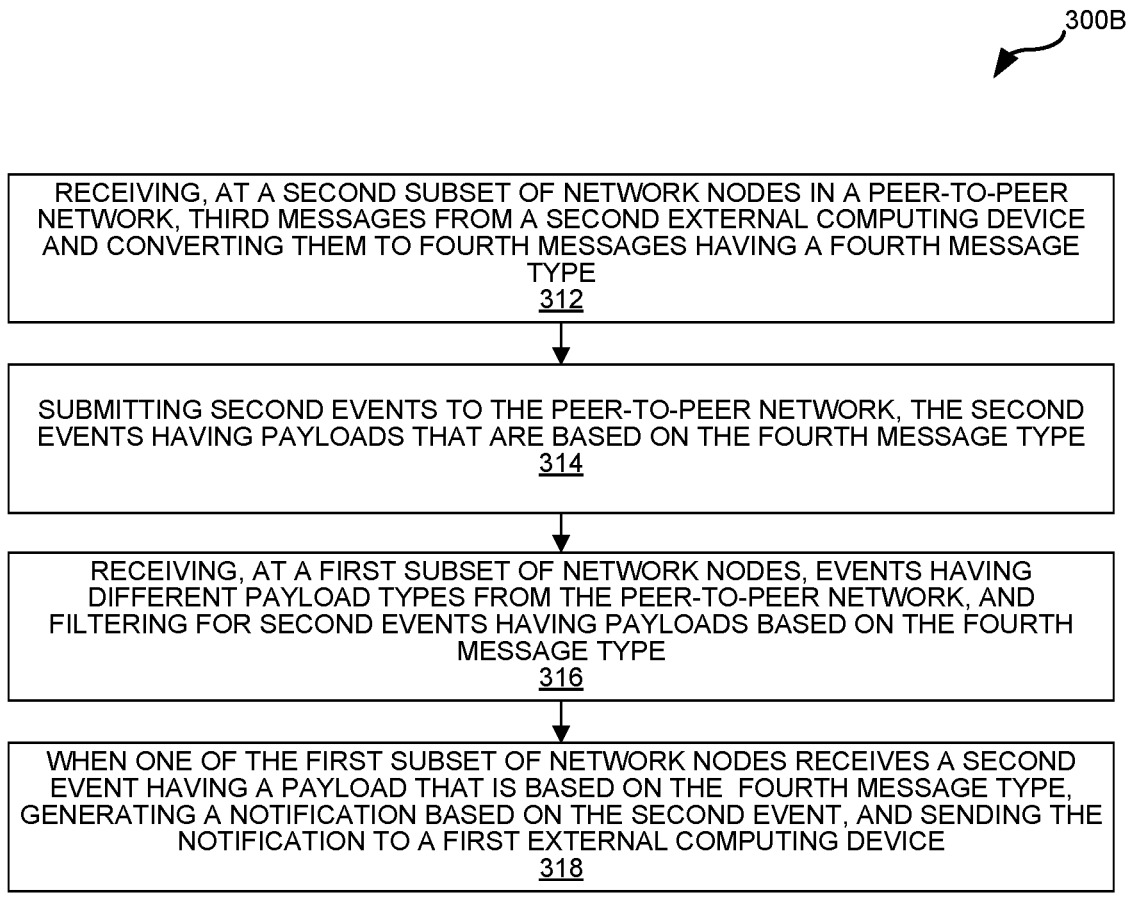
FIG. 3B is a flow diagram illustrating another exemplary method for context based filtering within subsets of network nodes implementing a trading system.

FIG. 3B is a flow diagram illustrating another exemplary method 300B for context based filtering within subsets of network nodes 102-104 implementing a trading system 100. As with the method 300A in FIG. 3A, at least two different subsets of network nodes (and optionally more than two) are used to implement a peer-to-peer network 114 that performs the method 300B in FIG. 3B. Each of the multiple nodes 102-104 may build a hashgraph to build a consensus about the ordering of events within the peer-to-peer network 114, e.g., a consensus about the timestamp indicating when events were submitted to the peer-to-peer network 114. Each network node 102-104 may include at least one processor executing instructions stored on at least one memory. Optionally, the method 300B of FIG. 3B may be performed sequentially and/or in parallel to the method 300A of FIG. 3A, e.g., using the same first subset of network nodes 102-104 (e.g., trade service nodes 102), second subset of network nodes 102-104 (e.g., gateway nodes 103), first external computing device 110 (e.g., a computing device 201 implementing a client 110) and second external computing device 112 (e.g., an order management system 112).

Exemplary method 300 begins at block 312 where (at least one of) the second subset of network nodes 103 (in a peer-to-peer network 114) receives third messages from the second external computing device 112, and converts them to fourth messages having a fourth message type. In examples, the second subset of network nodes 103 may be configured to convert the third messages (e.g., execution reports) in a second format (e.g., the FIX format) to fourth messages (e.g., execution reports) in a first format (e.g., a JSON representation of the FIX format). Execution reports may include any of a timestamp of execution, expected settlement date, asset identifier (e.g., CUSIP number, ticker symbol, etc.), quantity, price, type of order, amount proceeds, commissions charged, and/or other fees charged for trade execution. Optionally, the third messages may be transmitted via a second interface 109, as described above.

Exemplary method 300 proceeds to block 314 where second events are submitted to the peer-to-peer network 114, the second events having payloads that are based on the fourth message type. Therefore, submitting a second event to the network nodes 102-104 may include one of the second subset of network nodes 103: (1) generating a second event having a payload that is based on the fourth message type; and (2) sending the second event to another network node 102-104 in the peer-to-peer network 114, which sends the second event to another network node 102-104, etc.

The second event may be generated by passing a fourth message (e.g., execution report) to a submit function in a Hashgraph library (running on one of the second subset of network nodes 103). In addition to the payload (based on a fourth message type), each second event may include (1) the hash of the last event the one of the second subset of network nodes 103 received from another node 102-104; (2) the hash of the last event the one of the second subset of network nodes 103 created; and/or (3) a timestamp of submission to the peer-to-peer network 114 and/or a digital signature.

Exemplary method 300 proceeds to block 316 where (at least one of) the first subset of network nodes 102 receives events having different payload types from the peer-to-peer network 114, and filters for second events having payloads based on the fourth message type (e.g., but not other types of payloads). In examples, the events that are submitted to and output from the peer-to-peer network 114 have payload types that include (but are not limited to) new order single messages, execution reports, order cancel requests, and/or order status requests.

The filtering may be performed (upon receiving an event, e.g., a second event) by calling a return transaction function (e.g., handleTransaction( )) (in the Hashgraph library at a receiving node 102-104) with one or more of the following arguments: (1) the payload (or data derived from the payload) in the second event; (2) a Boolean argument (e.g., isConsensus) indicating whether consensus was reached (by the peer-to-peer network 114) on the timestamp in the second event; (3) the timestamp from the second event; (4) an event ID for the second event; and/or (5) an address. The return transaction function (e.g., handleTransaction( )) may be implemented in an application that is separate from the Hashgraph library on each trade node 102-104 in the peer-to-peer network 114.

In examples, the first subset of network nodes (e.g., trade service nodes 102) may filter for second events having payloads that are based on the fourth message type, but not events having at least one other type of payload, e.g., the first subset of network nodes 102 may filter for events having execution report payloads, but not for new order single message payloads, order cancel request payloads, and/or order status request payloads. Therefore, the first subset of network nodes 102 may examine/analyze/interpret the contents of an event payload (e.g., in a second event) during the filtering to determine the type of payload. Optionally, the first subset of network nodes (e.g., trade service nodes 102) may also contextually filter events based on whether a consensus has been reached for the timestamp in the event, e.g., whether isConsensus flag in a received event is true.

Exemplary method 300 proceeds to block 318 where, when one of the first subset of network nodes 102 receives a second event having a payload that is based on the fourth message type (and optionally a timestamp for which a consensus has been reached), the network node 102 may generate a notification based on the second event, and transmit the notification to a first external computing device 110, e.g., in a TLS, web socket, or HTTPS session. The notification may be generated in a different format than the payload of the second event. Optionally, the first subset of network nodes 102 may communicate with the first external computing device 110 via a first interface 108, as described above.

The techniques introduced here can be embodied as special-purpose hardware (such as circuitry), as programmable circuitry appropriately programmed with software and/or firmware, or as a combination of special-purpose and programmable circuitry. Hence, embodiments may include a machine-readable medium having stored thereon instructions that may be used to program a computer (or other electronic devices) to perform a process. The machine-readable medium may include, for example, floppy diskettes, optical disks, compact disc read-only memories (CD-ROMs), magneto-optical disks, read-only memories (ROMs), random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

Computer System Overview

Figure 4:
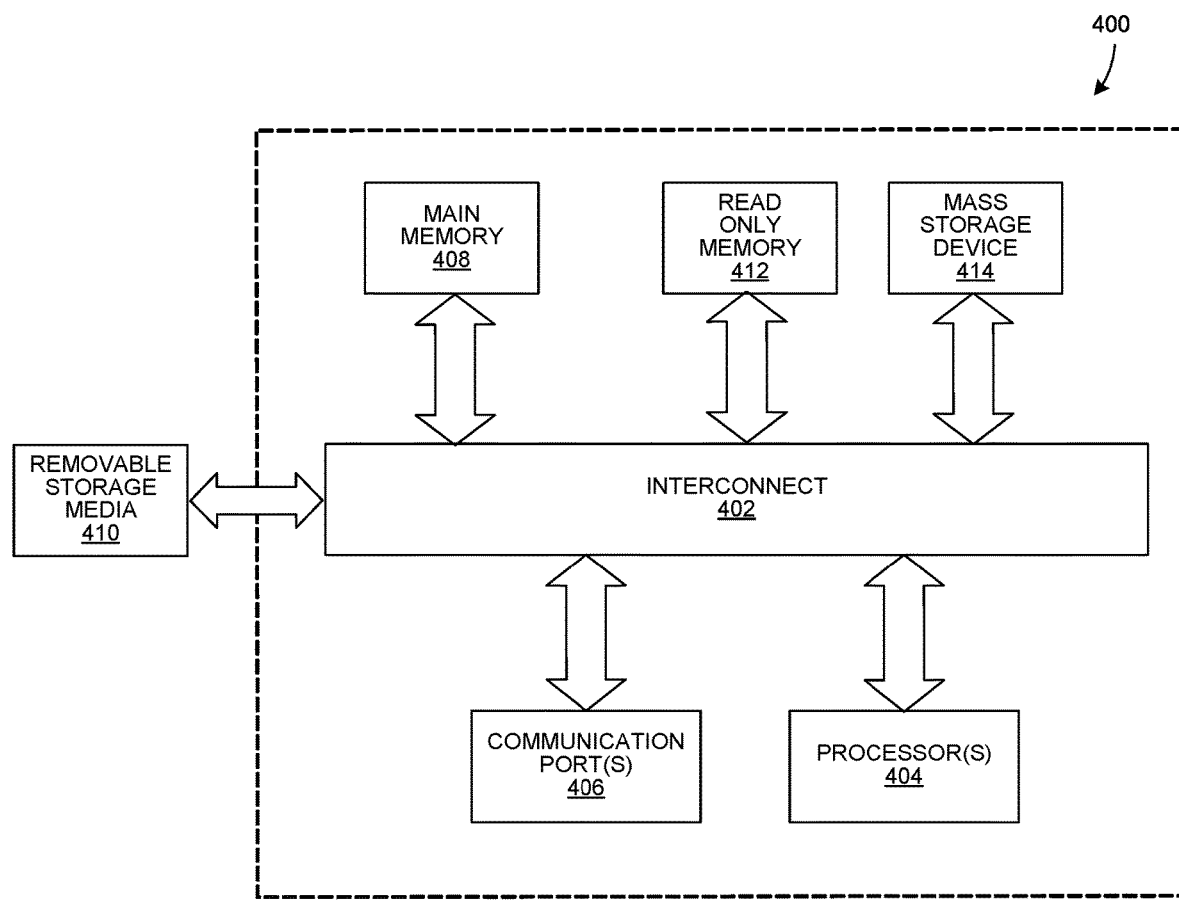
FIG. 4 is a block diagram illustrating an exemplary computer system with which some embodiments of the present disclosure may be utilized.

Embodiments of the present disclosure include various steps and operations, which have been described above. A variety of these steps and operations may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 4 is a block diagram illustrating an exemplary computer system with which some embodiments of the present disclosure may be utilized. According to the present example, the computer system 400 includes an interconnect 402, at least one processor 404, at least one communication port 406, at least one main memory 408, at least one removable storage media 410, at least one read only memory 412, and at least one mass storage device 414.

The at least one processor 404 can be any known processor. The at least one communication port 406 can be or include, for example, any of an RS-232 port for use with a modem-based dialup connection, a 10/100 Ethernet port, or a Gigabit port using copper or fiber. The nature of the at least one communication port 406 may be chosen depending on a network such a Local Area Network (LAN), Wide Area Network (WAN), or any network to which the computer system 400 connects. The at least one main memory 408 can be Random Access Memory (RAM), or any other dynamic storage device(s) commonly known in the art. The at least one read only memory 412 can be any static storage device (s) such as Programmable Read Only Memory (PROM) chips for storing static information such as instructions for the at least one processor 80.

The at least one mass storage device 414 can be used to store information and instructions. For example, hard disks such as the Adaptec® family of SCSI drives, an optical disc, an array of disks such as RAID, such as the Adaptec family of RAID drives, or any other mass storage devices may be used. Interconnect 402 can be or include one or more buses, bridges, controllers, adapters, and/or point-to-point connections. Interconnect 402 communicatively couples the at least one processor 404 with the other memory, storage, and communication blocks. Interconnect 402 can be a PCI/PCI-X or SCSI based system bus depending on the storage devices used. The at least one removable storage media 410 can be any kind of external hard-drives, floppy drives, Compact Disc-Read Only Memory (CD-ROM), Compact Disc-Re-Writable (CD-RW), Digital Video Disc-Read Only Memory (DVD-ROM).

The components described above are meant to exemplify some types of possibilities. In no way should the aforementioned examples limit the disclosure, as they are only examples.

Terminology

Brief definitions of terms, abbreviations, and phrases used throughout this application are given below.

The term "determining" may include calculating, computing, generating, processing, deriving, investigating, looking up (e.g., looking up in a table, a database or another data structure), ascertaining and the like. Also, "determining" may also include receiving (e.g., receiving information), accessing (e.g., accessing data in a memory) and the like. Also, "determining" may include resolving, selecting, choosing, establishing and the like.

The phrase "based on" does not mean "based only on," unless expressly specified otherwise. In other words, the phrase "based on" describes both "based only on" and "based at least on". Additionally, the phrase "based on" does not preclude intermediate steps, e.g., A is based on C may mean that B is based on C and A is based on B. Additionally, the term "and/or" means "and" or "or". In examples, "A and/or B" can mean "A", "B", or "A and B". Additionally, "A, B, and/or C" can mean "A alone," "B alone," "C alone," "A and B," "A and C," "B and C" or "A, B, and C."

The terms "connected", "coupled", and "communicatively coupled" and related terms are used in an operational sense and are not necessarily limited to a direct physical connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

The phrases "in examples", "in example embodiments", "in some embodiments," "according to some embodiments," "in the embodiments shown," "in other embodiments," "embodiments," and the like generally mean the particular feature, structure, or characteristic following the phrase is included in at least one embodiment of the present disclosure, and may be included in more than one embodiment of the present disclosure. In addition, such phrases do not necessarily refer to the same embodiments or different embodiments.

If the specification states a component or feature "may," "can," "could," or "might" be included or have a characteristic, that particular component or feature is not required to be included or have the characteristic.

The term "responsive" includes completely or partially responsive.

The term "module" refers broadly to a software, hardware, or firmware (or any combination thereof) component. Modules are typically functional components that can generate useful data or other output using specified input(s). A module may or may not be self-contained. An application program (also called an "application") may include one or more modules, or a module can include one or more application programs.

The term "network" generally refers to a group of interconnected devices capable of exchanging information. A network may be as few as several personal computers on a Local Area Network (LAN) or as large as the Internet, a worldwide network of computers. As used herein, "network" is intended to encompass any network capable of transmitting information from one entity to another. In some cases, a network may be comprised of multiple networks, even multiple heterogeneous networks, such as one or more border networks, voice networks, broadband networks, financial networks, service provider networks, Internet Service Provider (ISP) networks, and/or Public Switched Telephone Networks (PSTNs), interconnected via gateways operable to facilitate communications between and among the various networks.

Also, for the sake of illustration, various embodiments of the present disclosure have herein been described in the context of computer programs, physical components, and logical interactions within modern computer networks. Importantly, while these embodiments describe various embodiments of the present disclosure in relation to modern computer networks and programs, the method and apparatus described herein are equally applicable to other systems, devices, and networks as one skilled in the art will appreciate. As such, the illustrated applications of the embodiments of the present disclosure are not meant to be limiting, but instead are examples. Other systems, devices, and networks to which embodiments of the present disclosure are applicable include, for example, other types of communication and computer devices and systems. More specifically, embodiments are applicable to communication systems, services, and devices such as cell phone networks and compatible devices. In addition, embodiments are applicable to all levels of computing from the personal computer to large network mainframes and servers.

In conclusion, the present disclosure provides novel systems, methods, and arrangements for context based filtering within subsets of network nodes implementing a trading system. While detailed descriptions of one or more embodiments of the disclosure have been given above, various alternatives, modifications, and equivalents will be apparent to those skilled in the art without varying from the spirit of the disclosure. For example, while the embodiments described above refer to particular features, the scope of this disclosure also includes embodiments having different combinations of features and embodiments that do not include all of the described features. Accordingly, the scope of the present disclosure is intended to embrace all such alternatives, modifications, and variations as fall within the scope of the claims, together with all equivalents thereof. Therefore, the above description should not be taken as limiting.

Example Embodiments

Example 1 includes a system comprising: multiple network nodes communicatively coupled in a peer-to-peer network, wherein the network nodes include a first subset of network nodes and a second subset of network nodes; wherein the first subset of network nodes is configured to interface with at least a first external computing device; wherein the second subset of network nodes is configured to interface with at least a second external computing device; wherein the first subset of network nodes is configured to generate first messages having a first message type based on requests received from the first external computing device; wherein the first subset of network nodes is configured to submit first events to the peer-to-peer network, the first events having payloads that are based on the first message type; wherein the network nodes are configured to use at least one directed acyclic graph (DAG) to attempt to reach a consensus about timestamps in the first events; wherein the second subset of network nodes is configured to receive events having different payload types from the peer-to-peer network and filter for first events having payloads based on the first message type; and wherein the second subset of network nodes is configured to, when a first event having a payload that is based on the first message type, convert the payload into a second message that is sent to a second external computing device.

Example 2 includes the system of Example 1, wherein the second subset of network nodes is configured to receive third messages from the second external computing device, and convert them into fourth messages having a fourth message type; wherein the second subset of network nodes is configured to submit second events to the peer-to-peer network, the second events having payloads that are based on the fourth message type; wherein the first subset of network nodes is configured to receive events having different payload types from the peer-to-peer network and filter for second events having payloads based on the fourth message type; and wherein the first subset of network nodes is configured to, when a first event having a payload that is based on the fourth message type, generate a notification based on the second event and send the notification to the first external computing device.

Example 3 includes the system of Example 2, wherein the first messages are in a different format than the second messages, wherein the third messages are in a different format than the fourth messages.

Example 4 includes the system of any of Examples 1-3, wherein the second subset of network nodes is configured to filter for first events having timestamps for which a consensus has been reached.

Example 5 includes the system of any of Examples 1-4, wherein the second subset of network nodes is configured to analyze the payload of first events when filtering for first events having payloads based on the first message type.

Example 6 includes the system of any of Examples 1-5, wherein the first subset of network nodes and the second subset of network nodes are mutually exclusive.

Example 7 includes the system of any of Examples 1-6, wherein the directed acyclic graph is an IOTA or a Hashgraph.

Example 8 includes the system of any of Examples 1-7, wherein the network nodes are selected from at least one of servers, personal computers, laptop computers, tablet computers, or smart phones.

Example 9 includes the system of any of Examples 1-8, wherein the network nodes are physically distributed across the world.

Example 10 includes the system of any of Examples 1-9, wherein the network nodes are communicatively coupled using at least one of at least one wired network or at least one wireless network.

Example 11 includes a method comprising: generating first messages having a first message type, at a first subset of network nodes in a peer-to-peer network, based on requests received from a first external computing device; submitting second events to the peer-to-peer network, the first events having payloads that are based on the first message type; using at least one directed acyclic graph (DAG) to attempt to reach a consensus about timestamps in the first events; receiving, at a second subset of network nodes, events having different payload types from the peer-to-peer network and filtering for first events having payloads based on the first message type; and when one of the second subset of network nodes receives a first event having a payload that is based on the first message type, converting the payload into a second message that is sent to a second external computing device.

Example 12 includes the method of Example 11, further comprising: receiving, at the second subset of network nodes, third messages from the second external computing device, and converting them into fourth messages having a fourth message type; submit second events to the peer-to-peer network, the second events having payloads that are based on the fourth message type; receiving, at the first subset of network nodes, events having different payload types from the peer-to-peer network and filter for second events having payloads based on the fourth message type; and when one of the first subset of network nodes receives a first event having a payload that is based on the fourth message type, generating a notification based on the second event and sending the notification to the first external computing device.

Example 13 includes the method of any of Examples 11-12, wherein the first messages are in a different format than the second messages, wherein the third messages are in a different format than the fourth messages.

Example 14 includes the method of any of Examples 11-13, wherein the second subset of network nodes is configured to filter for first events having timestamps for which a consensus has been reached.

Example 15 includes the method of any of Examples 11-14, wherein the second subset of network nodes is configured to analyze the payload of first events when filtering for first events having payloads based on the first message type.

Example 16 includes the method of any of Examples 11-15, wherein the first subset of network nodes and the second subset of network nodes are mutually exclusive.

Example 17 includes the method of any of Examples 11-16, wherein the directed acyclic graph is an IOTA or a Hashgraph.

Example 18 includes the method of any of Examples 11-17, wherein the network nodes are selected from at least one of servers, personal computers, laptop computers, tablet computers, or smart phones.

Example 19 includes the method of any of Examples 11-18, wherein the network nodes are physically distributed across the world.

Example 20 includes the method of any of Examples 11-19, wherein the network nodes are communicatively coupled using at least one of at least one wired network or at least one wireless network.

What is claimed is:

1. A system comprising:
   network nodes communicatively coupled in a peer-to-peer network, wherein the network nodes include a first subset of the network nodes and a second subset of the network nodes;
   wherein the first subset of the network nodes is configured to interface with at least a first external computing device;
   wherein the second subset of the network nodes is configured to interface with at least a second external computing device;
   wherein the first subset of the network nodes is configured to generate first messages having a first message type based on requests received from the first external computing device;
   wherein the first subset of the network nodes is configured to submit first events to the peer-to-peer network, the first events having payloads based on the first message type;
   wherein the network nodes are configured to use at least one directed acyclic graph (DAG) to attempt to reach consensus about timestamps in the first events;
   wherein the second subset of the network nodes is configured to receive events having different payload types from the peer-to-peer network and filter for any of the first events having the payloads based on the first message type; and
   wherein the second subset of the network nodes is configured to, when any of the first events having the payloads based on the first message type are received, convert the payloads into second messages that are sent to the second external computing device.

2. The system of claim 1, wherein the second subset of the network nodes is configured to receive third messages from the second external computing device, and convert them into fourth messages having a fourth message type;
   wherein the second subset of the network nodes is configured to submit second events to the peer-to-peer network, the second events having payloads based on the fourth message type;

wherein the first subset of the network nodes is configured to receive events having the different payload types from the peer-to-peer network and filter for any of the second events having the payloads based on the fourth message type; and wherein the first subset of the network nodes is configured to, when any of the first events having the payloads based on the fourth message type is received, generate a notification based on at least one of the second events and send the notification to the first external computing device.

3. The system of claim 2, wherein the first messages are in a different format than the second messages, wherein the third messages are in a different format than the fourth messages.

4. The system of claim 1, wherein the second subset of the network nodes is configured to filter for any of the first events having timestamps for which consensus has been reached.

5. The system of claim 1, wherein the second subset of the network nodes is configured to analyze the payloads of the first events when filtering for any of the first events having the payloads based on the first message type.

6. The system of claim 1, wherein the first subset of the network nodes and the second subset of the network nodes are mutually exclusive.

7. The system of claim 1, wherein the at least one directed acyclic graph is an IOTA or a Hashgraph.

8. The system of claim 1, wherein the network nodes are selected from at least one of servers, personal computers, laptop computers, tablet computers, or smart phones.

9. The system of claim 1, wherein the network nodes are physically distributed globally.

10. The system of claim 1, wherein the network nodes are communicatively coupled using at least one of at least one wired network or at least one wireless network.

11. A method comprising:
generating first messages having a first message type, at a first subset of network nodes in a peer-to-peer network, based on requests received from a first external computing device;
submitting first events to the peer-to-peer network, the first events having payloads based on the first message type;
using at least one directed acyclic graph (DAG) to attempt to reach consensus about timestamps in the first events;
receiving, at a second subset of the network nodes, events having different payload types from the peer-to-peer network and filtering for any of the first events having the payloads based on the first message type; and when one of the second subset of the network nodes receives any of the first events having payloads that are based on the first message type, converting the payloads into second messages that are sent to a second external computing device.

12. The method of claim 11, further comprising:
receiving, at the second subset of the network nodes, third messages from the second external computing device, and converting them into fourth messages having a fourth message type;
submitting second events to the peer-to-peer network, the second events having payloads based on the fourth message type;
receiving, at the first subset of the network nodes, events having the different payload types from the peer-to-peer network and filter for any of the second events having payloads based on the fourth message type; and
when one of the first subset of the network nodes receives any of the first events having payloads based on the fourth message type, generating a notification based on at least one of the second events and sending the notification to the first external computing device.

13. The method of claim 12, wherein the first messages are in a different format than the second messages, wherein the third messages are in a different format than the fourth messages.

14. The method of claim 11, wherein the second subset of the network nodes is configured to filter for any of the first events having timestamps for which consensus has been reached.

15. The method of claim 11, wherein the second subset of the network nodes is configured to analyze the payloads of the first events when filtering for any of the first events having the payloads based on the first message type.

16. The method of claim 11, wherein the first subset of the network nodes and the second subset of the network nodes are mutually exclusive.

17. The method of claim 11, wherein the at least one directed acyclic graph is an IOTA or a Hashgraph.

18. The method of claim 11, wherein the network nodes are selected from at least one of servers, personal computers, laptop computers, tablet computers, or smart phones.

19. The method of claim 11, wherein the network nodes are physically distributed globally.

20. The method of claim 11, wherein the network nodes are communicatively coupled using at least one of at least one wired network or at least one wireless network.

* * * * *